Nov. 18, 1941.  E. R. STONE  2,263,403

STOKER GRATE CONSTRUCTION

Filed Dec. 13, 1938  6 Sheets-Sheet 2

WITNESSES:  
James K. Mosser  
E. H. Lutz

INVENTOR  
EARLL R. STONE.  
BY  
A. B. Ricans  
ATTORNEY

Nov. 18, 1941.   E. R. STONE   2,263,403
STOKER GRATE CONSTRUCTION
Filed Dec. 13, 1938   6 Sheets-Sheet 3
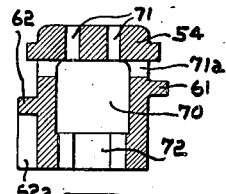
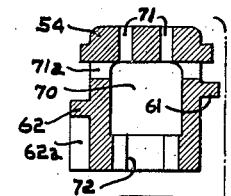
Fig. 4.
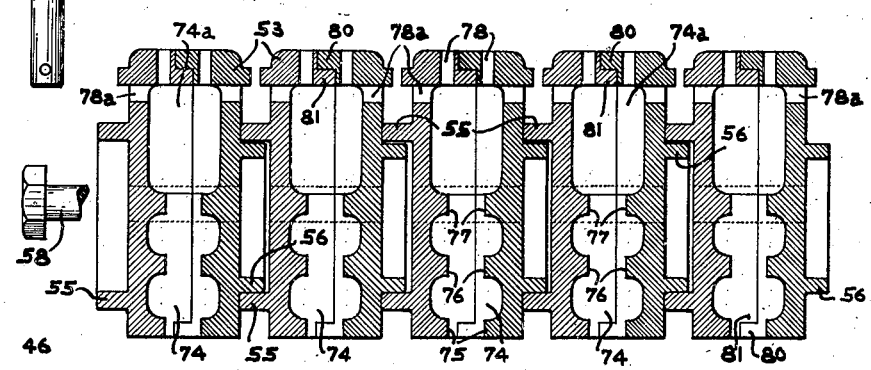
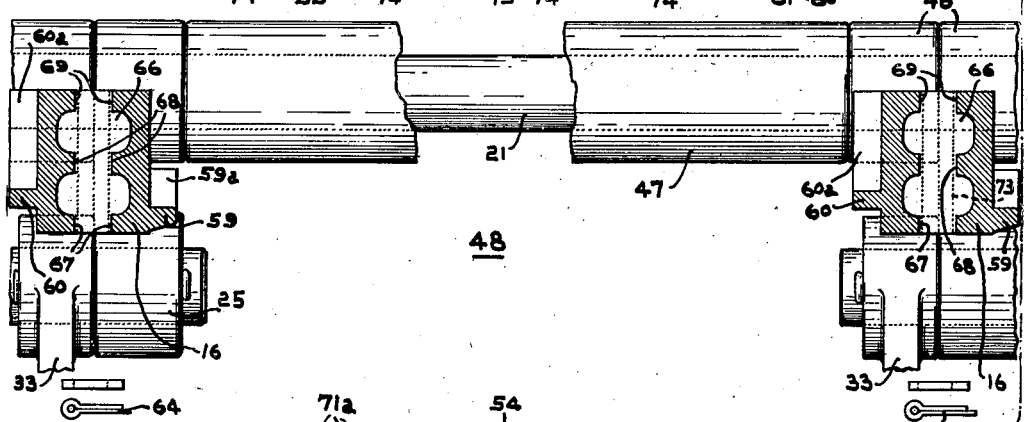
Fig. 5.
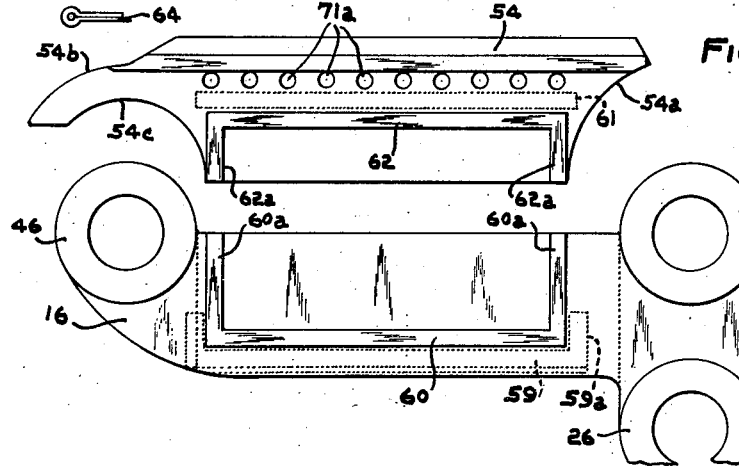
Fig. 6.
INVENTOR
EARLL R. STONE.
BY
ATTORNEY Nov. 18, 1941.  E. R. STONE  2,263,403
STOKER GRATE CONSTRUCTION
Filed Dec. 13, 1938  6 Sheets-Sheet 4

INVENTOR
EARLL R. STONE.
BY
ATTORNEY

Nov. 18, 1941.  E. R. STONE  2,263,403
STOKER GRATE CONSTRUCTION
Filed Dec. 13, 1938   6 Sheets-Sheet 5

WITNESSES:
James K. Mosser
E. H. Lutz

INVENTOR
EARLL R. STONE.
BY
R. B. Reaves
ATTORNEY

Nov. 18, 1941.  E. R. STONE  2,263,403
STOKER GRATE CONSTRUCTION
Filed Dec. 13, 1938  6 Sheets-Sheet 6

INVENTOR
EARLL R. STONE.
BY
ATTORNEY

Patented Nov. 18, 1941

2,263,403

UNITED STATES PATENT OFFICE 2,263,403

STOKER GRATE CONSTRUCTION

Earll R. Stone, Lansdowne, Pa., assignor to Westinghouse Electric & Manufacturing Company, East Pittsburgh, Pa., a corporation of Pennsylvania Application December 13, 1938, Serial No. 245,495

10 Claims. (Cl. 110—33)

My invention relates to stokers of the type shown and described in United States Patents Nos. 1,683,341, September 4, 1928, and 1,806,554, May 19, 1931, and it has for an object to provide an improved grate surface and its supporting means for apparatus of this character.

A more particular object of my invention is to improve the grates, such as shown in the aforesaid patents, from the point of view of replacement of the fuel-contacting grate elements as well as that of air distribution. In the constructions shown in the aforesaid patents, replacement of grate bars involves substantial dismantling of the operating structure and work above and below the stoker, particularly as the fuel-contacting bars are connected in end-to-end relation by hinge pins and the bars themselves are directly acted upon by the mechanism imparting motion of an undulatory character to the grate. Patent No. 1,805,618, May 19, 1931, shows an endeavor to segregate the grate bars from the link support and to facilitate insertion and removal of bars, this patent disclosing a plurality of pivotally connected frames with bars fitting in each frame opening, each frame opening being widened at one end to permit the insertion of the depending webs of bars having notches engaged by opposed rim portions of the major and narrower part of the frame opening. The bars for a frame must, therefore, be removed and inserted one by one at the widened filling place, the inserted bars being slid laterally as required. In accordance with the present invention, this general type of construction is improved in several respects: the use of frames and bars with connecting features, requiring lateral shifting of the bars with respect to the frames as the latter are removed or inserted one by one, is avoided; the bars are given more adequate lateral support; and provision is made for improved supply of air to the fuel bed.

A further object of my invention is to provide a link type supporting structure which is given undulatory motion and motion in the direction of fuel feed by any suitable mechanism together with top-attached grate bars which cover the links of the supporting structure with the result that component elements may be designed and constructed of materials best suited for operating requirements.

A further object of my invention is to provide a link structure made up of a plurality of rows of links with the links of each row connected together in end-to-end relation by pins such that the pins and the links form a plurality of rectangular spaces together with grate bars covering the links and arranged in groups filling the spaces.

A further object of my invention is to provide a stoker embodying a supporting structure of the link type together with grate bars carried thereby and covering the links, the bars and links being formed with hollow passages for furnishing air to the fuel-supporting surface and each passage having a multiplicity of orifices extending transversely thereof in order to secure improved air distribution to the fuel-supporting surface.

A further object of my invention is to provide a grate construction embodying supporting members with grate bars superposed thereon and detachably fastened thereto, each grate bar having an internal chamber extending lengthwise and opening through the bottom thereof and the supporting member having a passage extending therethrough for supplying air to the chamber, each grate bar having tuyère opening communicating with the chamber for supplying air to the fuel bed.

These and other objects are effected by my invention as will be apparent from the following description and claims taken in connection with the accompanying drawings, forming a part of this application, in which:

Fig. 4 is an exploded view of the parts shown in Fig. 3;

Fig. 5 is a side elevational view of one of the grate bars for covering a supporting link;

Fig. 6 is a side elevational view of a link;

Figure 1:
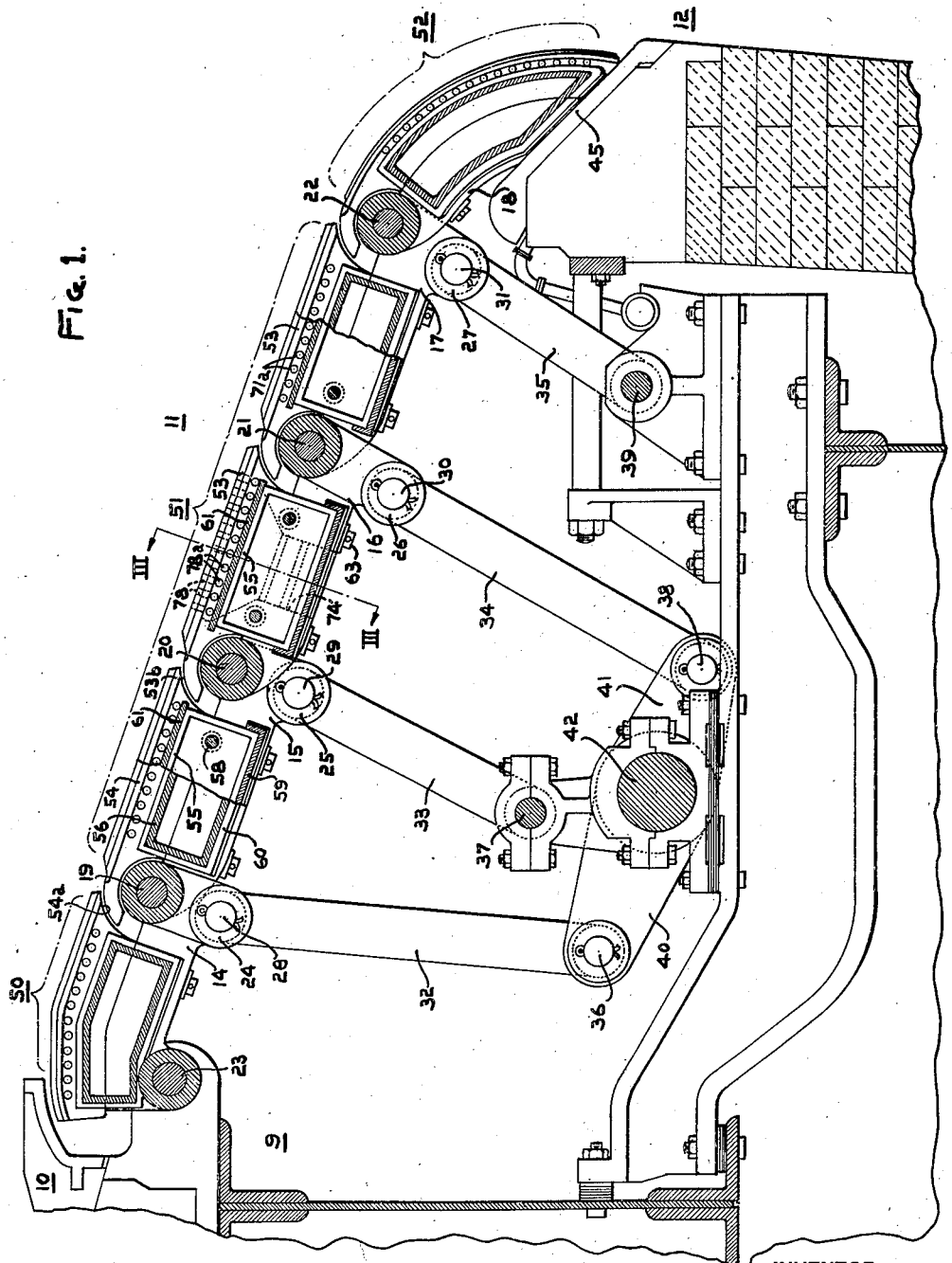
Fig. 1 is a longitudinal, sectional view of my improved link grate construction.
Figure 2:
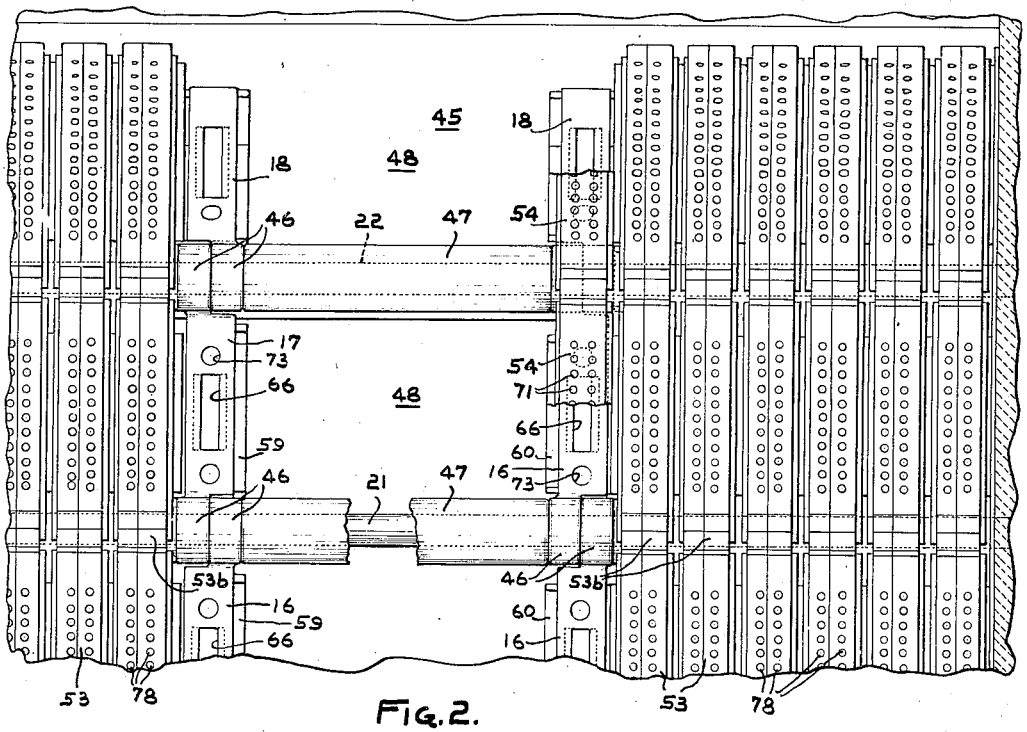
Fig. 2 is a fragmentary plan view of the right-hand portion of Fig. 1.

In the drawings, there is shown generally, at 9, a stationary supporting structure of a stoker; the stoker having a discharge portion, shown at 10, either from the side of a retort, as in Patent 1,683,341, aforesaid, or from the lower ends of a multiplicity of retorts, as shown in Patent 1,806,554 aforesaid. Fuel undergoing combustion in the retort or retorts is progressively delivered from the latter to the overfeed grate section, at 11, whereon it progressively travels with the requisite agitation and air admission to complete combustion, ash and refuse being discharged into the pit or space, at 12.

The grate section, at 11, comprises a mechanically actuated, undulatory supporting part and a fuel-contacting or refractory part providing the fuel-supporting surface.

Referring first to the mechanically operated undulatory supporting part for the grate surface, this comprises a plurality of rows of links 14, 15, 16, 17 and 18, with the links of each row connected together in end-to-end relation by the hinge or pivot pins or rods 19, 20, 21 and 22.

The initial link 14 of the structure is connected by a pivot pin 23 to the stationary stoker structure, at 9. The links 14, 15, 16 and 17 are provided with downwardly projecting ears 24, 25, 26 and 27, respectively, which are pivotally connected, at 28, 29, 30 and 31, to the upper ends of supporting links 32, 33, 34 and 35, whose lower ends are carried by the pivots 36, 37, 38 and 39, respectively.

As shown, the pivots 36 and 38 are carried by crank arms 40 and 41 attached to the rock shaft 42 mounted on the supporting structure, at 9, whereas the pivots 37 and 39 are directly mounted on the stationary supporting structure. With this arrangement, alternate pivotal connections 19 and 21 are periodically moved simultaneously in opposite directions and transversely of the direction of fuel feed or the direction of extent of the grate, with the result that the link construction has movement of an undulatory character given thereto. Since the initial link 14 is pivotally connected at its forward end to the stationary stoker structure, at 9, it will be apparent that the initial link merely has angular movement with respect to its pivot 23, whereas the pivotal connections afforded by the pins 19, 20, 21 and 22, not only move in the direction of fuel feed but also transversely thereto, the variable and changing undulatory movement imparted to the link structure causing variation in overall length thereof. Accordingly, the last link member 18 moves along a suitable support or slideway, as shown at 45, also carried by the stationary structure.

As shown in the drawings, adjacent ends of the links are provided with lapping ears 46 connected by the pins or rods 19, 20, 21 and 22, the latter being provided with any suitable means, such as the spacer sleeves 47, for spacing the rows of links apart, whereby the links and rods provide a plurality of rectangular spaces, at 48, for grate bars.

The grate surface is comprised by initial grate bars, at 50, intermediate bars, at 51, and terminal bars, at 52. Since these bars are similar so far as features of the present invention are concerned, a complete understanding will be had by consideration of the intermediate bars, at 51, in connection with Figs. 3 to 12, inclusive.

Figure 3:
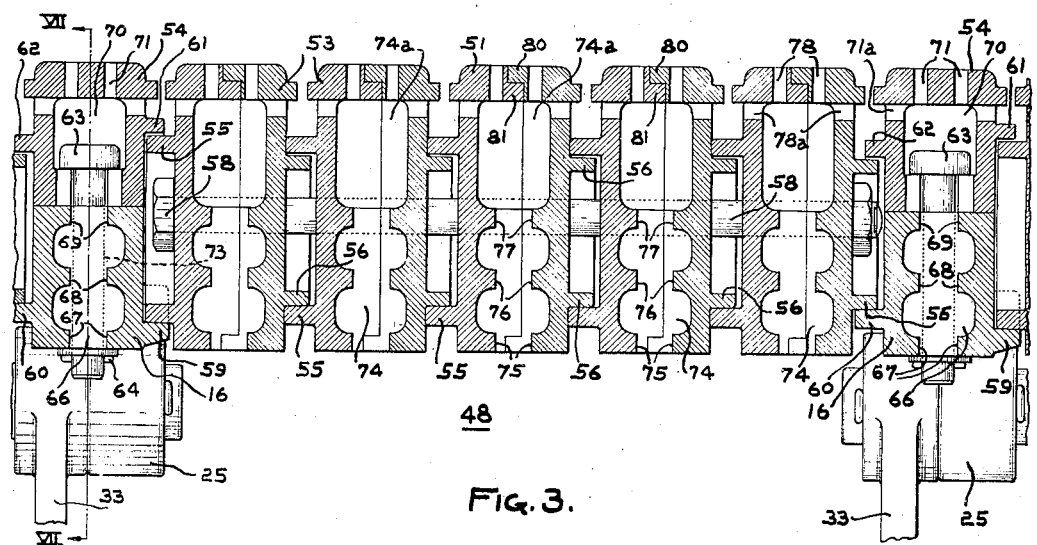
Fig. 3 is a sectional view taken along the line III—III of Fig. 1.
Figure 7:
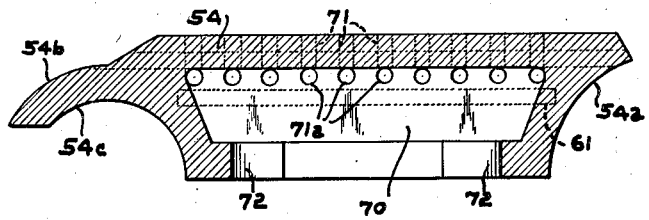
Fig. 7 is a sectional view of a link-covering grate bar and taken along the line VII—VII of Fig. 3.
Figure 8:
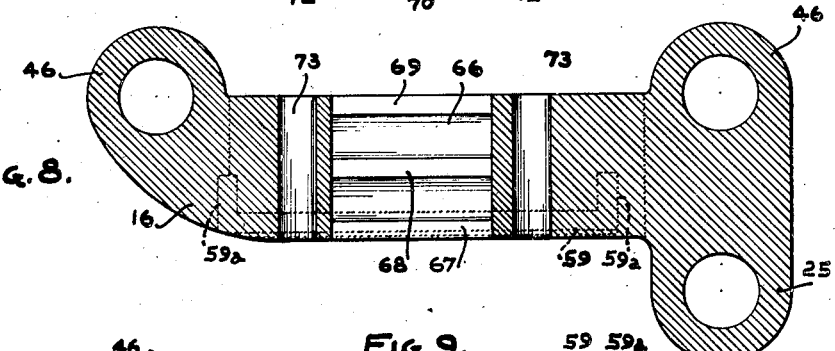
Fig. 8 is a sectional view of the link bar and taken along the line VII—VII of Fig. 3.
Figure 9:
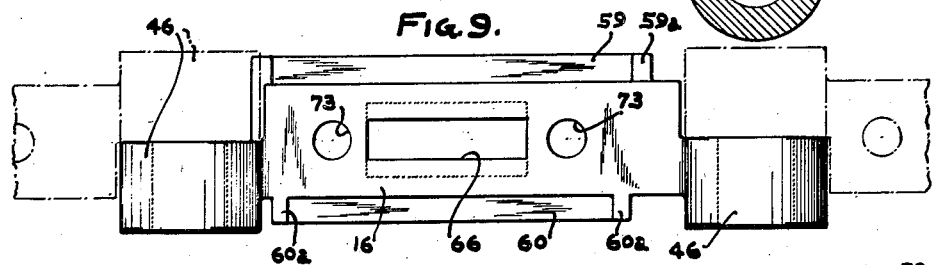
Fig. 9 is a top plan view of the bar shown in Fig. 8.

The main grate bars, at 51, include a plurality of groups of relatively deep bars 53 and relatively shallow bars 54, the bars 53 being connected together in groups or units with a group or unit arranged in each rectangular space, at 48, and supported by the links, for example, the links 16 in Fig. 3, whereas the bars 54 are superposed with respect to the links and cooperate with the bars 53 to present a continuous refractory, fuel-supporting surface covering and protecting the link-supporting structure.

Adjacent end portions of the bars 53 and 54 overlap to provide for continuity of the fuel-supporting surface and to shield or protect the supporting and actuating structure and are so constructed as to permit of relative angular movement of the bars. Accordingly, the rear ends of the bars 53 and 54 are provided with terminal portions having concave surfaces 53a and 54a overlapping convex surfaces 53b and 54b of terminal portions at the forward ends of the bars, the latter portions being formed to provide concavities 53c and 54c overlying the link pivotal connections including the spacer sleeves 47.

The bars 53 of each group are connected together in any suitable manner to form a self-supporting assembly or unit having adequate strength to bridge the space between the links of each rectangular space. To this end, the bars are preferably provided with interfitting recesses and projections and with tie bolts for holding all of the bars of an assembly together as a unit. More particularly, as shown in the drawings, the bars 53 are preferably provided with left and right hand lateral flanges or structures 55 and 56 so that the structure 56 will fit rather closely, telescope or spigot within a structure 55.

A sufficient number of bars to fill a space, at 48, are fitted together, with the interfitting recesses and projections provided by the telescoping flange structures 55 and 56, and are preferably held in similar relation by one or more tie bolts 58, the assembled group or unit then being ready for insertion in a rectangular space, at 48. As the unit or assembly has a flange structure 55 at the left hand side and a similar structure 56 at the right hand side thereof, the adjacent links, for example, the link 16 in Fig. 3, have lateral flanges 59 and 60 at the right and left hand sides thereof, the flange 59 being somewhat lower than the flange 60 so that the flange construction 55 may rest on the flange 59 and the construction 56 may rest on the flange 60 with the unit or assembly of grate bars having the tops thereof in proper position.

Figure 10:
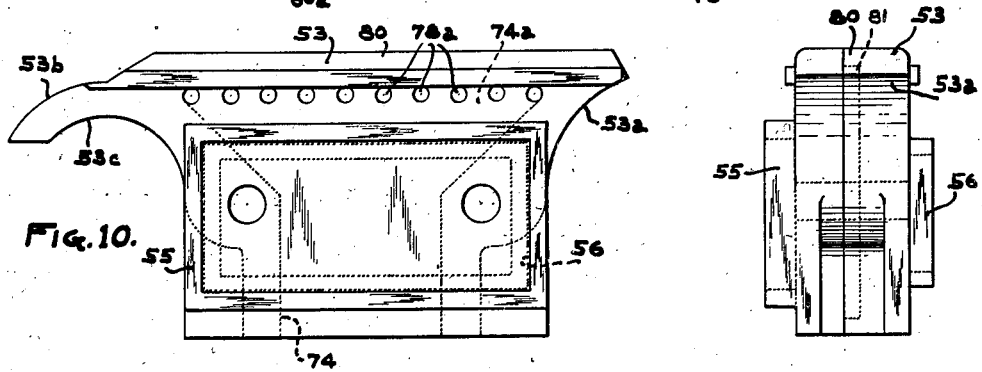
Fig. 10 is an exterior side elevation of the group or main grate bar.
Figure 11:
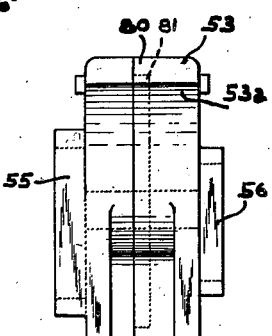
Fig. 11 is an end elevation of a main grate bar.
Figure 12:
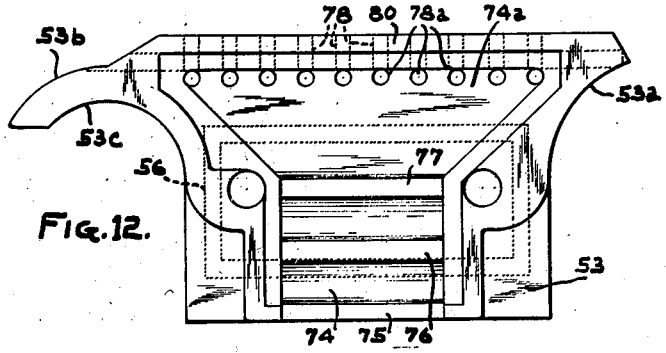
Fig. 12 is an interior side elevational view of one of the complementary halves of a main grate bar.

The relatively shallow bars 54 have lateral flanges 61 and 62, which, when the bars are in position on the links with the assemblies or units in the spaces, at 48, overlap the outside lateral flange structures 55 and 56, respectively, of the assemblies or units. As shown in Figs. 10 and 11, the flange structures 55 and 56 are substantially rectangular and such structures are so directed and interfit that the assembly has adequate strength when bridging the space between links and the bars of each unit are restrained against relative movement in any direction parallel to their length. Furthermore, the flanges 59 and 60 adjacent to the bottom sides of the links have upwardly-extending projections, for example, the projections 60a of Fig. 6, which cooperate with downwardly-extending projections 62a formed on the bar 54 to encompass a flange structure 55.

With a unit or assembly of bars 53 positioned in a space, at 48, it will be apparent that, when the bars 54 are placed in position on the links, the flanges 61 and 62 will cooperate with the flanges 59 and 60 to enclose the flange structures 56 and 55 to hold the units in place with respect to the links, the relatively shallow bars 54 being attached to the links 16 by means of hold-down bolts 63 and cooperating cotters 64.

The links are each provided with a hollow space or passage 66 opening through the lower and upper surfaces thereof and having opposed bars or ribs 67, 68, and 69 forming orifices extending transversely of the direction of flow.

Each of the relatively shallow grate bars 54 has an interior chamber 70 connected by tuyère openings 71 and 71a to the fuel-supporting surface. The chambers 70 of the bars 54 open through the bottoms thereof so that, with the bars properly assembled with respect to the links, such hollow interiors will be in communication with the hollow spaces or passages 66 of the links. Furthermore, the bars are provided with suitable means cooperating internally thereof to fasten them to the links, for example, the bars may have notched flanges 72 receiving shanks of the bolts 63 immediately adjacent to the heads thereof, the shanks extending through openings 73 formed in the link and the cotters 64 extending through the bolts immediately adjacent to the lower side of each link.

Each of the relatively deep grate bars 53 has a hollow interior passage, at 74, opening through the bottom side thereof and provided with opposed pairs of ribs 75, 76 and 77 forming orifices for the passage, with tuyère openings 78 and 78a affording communication between longitudinal chambers 74a forming upper portions of the passages and the fuel-supporting surface.

To facilitate manufacture of the relatively deep and hollow grate bars, particularly on account of the external flange structures and the internal orifice-forming ribs, such bars are each preferably made in vertically complementary halves having closely fitting spigoted flanges 80 and 81. With assembly of the halves of each bar and of the bars with the various spigoted flanges interfitting and the tie bolts properly tightened, it will be apparent that each suit or assembly will be held together as a rigid unitary structure.

Figure 13:
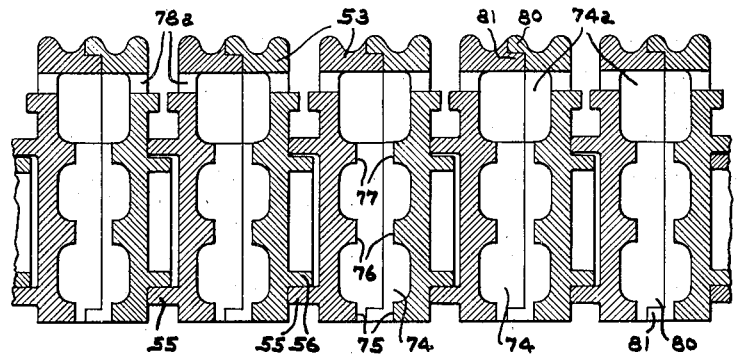
Fig. 13 is a sectional view similar to Fig. 3 but showing a second embodiment of the invention.

In Fig. 13, there is shown a construction which is similar in all respects to that already described except that the top tuyère passages 78 are omitted, only lateral passages 78a being provided.

Figure 14:
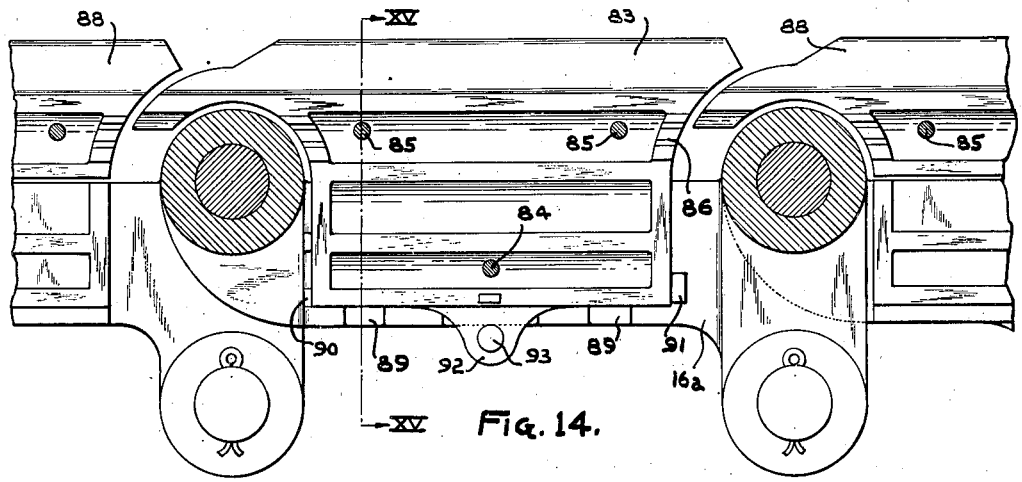
Fig. 14 is a fragmentary side elevational view showing a third embodiment of my invention.
Figure 15:
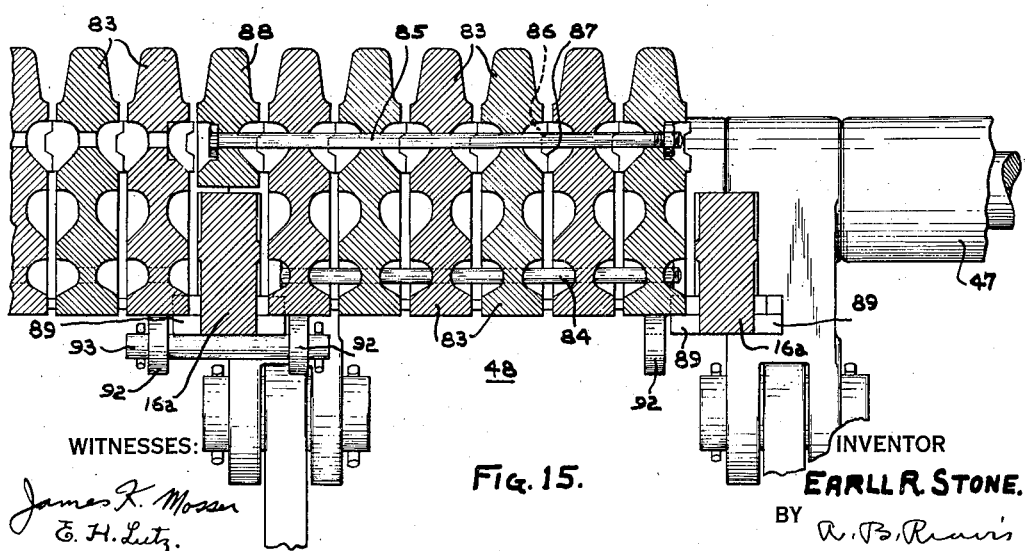
Fig. 15 is a sectional view taken along the line XV—XV of Fig. 14.

In the construction shown in Figs. 14 and 15, the rectangular spaces, at 48, are filled by assemblies of relatively deep bars 83 held together as a unit by means of tie bolts 84 and 85 and by the interfitting recesses and projections 86 and 87. The links 16a are covered by the relatively shallow bars 88; however, instead of having the bars 88 resting on and supported by the links 16a, such bars are supported laterally from the units or assemblies of relatively deep bars 83, the tie bolts 85 being made sufficiently longer for this purpose and the shallow bars 88 and an adjacent relatively deep bar having interfitting recesses and projections 86 and 87, as already described.

With an assembly of relatively deep bars and one or more shallow bars connected together as shown in Fig. 15, the relatively deep bars of the assembly are inserted in the space, at 48, the lower edges of the outermost bars thereof resting on the lugs or projections 89 formed at the lower sides of the links 16a. Also, the links have projections 90 and 91 which resist endwise movement relatively to the links.

As shown in Fig. 15, the outermost relatively deep bars 83 of each group are provided with depending ears 92 so that, after assembly of units in adjacent spaces, pins 93 may be inserted through the ears of adjacent groups and underneath the intervening link 16a with the result that the grate bar units are firmly anchored in place.

Where the relatively shallow grate bar is carried at the left hand side of an assembly, as shown in Fig. 15, the right hand side of the adjacent assembly will be constituted only by the relatively deep bar 83. It will be apparent that the shallow bars may be arranged at either side of an assembly or alternate assemblies may carry such bars.

Figure 16:
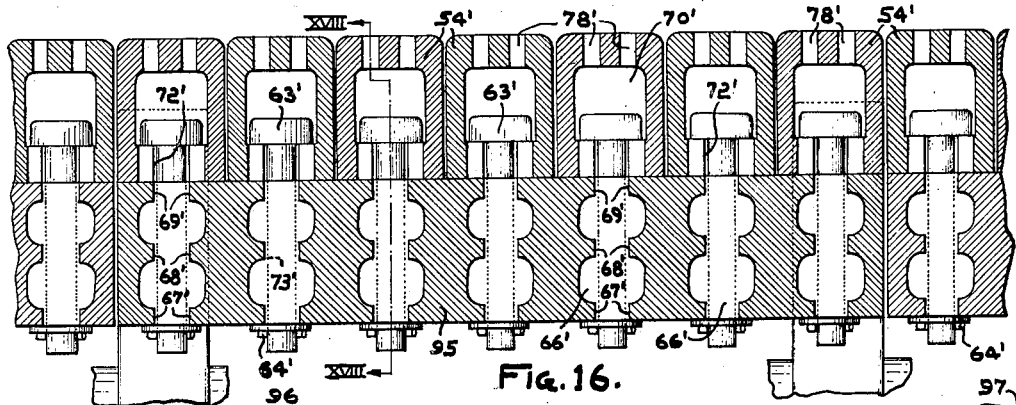
Fig. 16 is a sectional view taken along the line XVI—XVI of Fig. 17 of a fourth embodiment of my invention.
Figure 17:
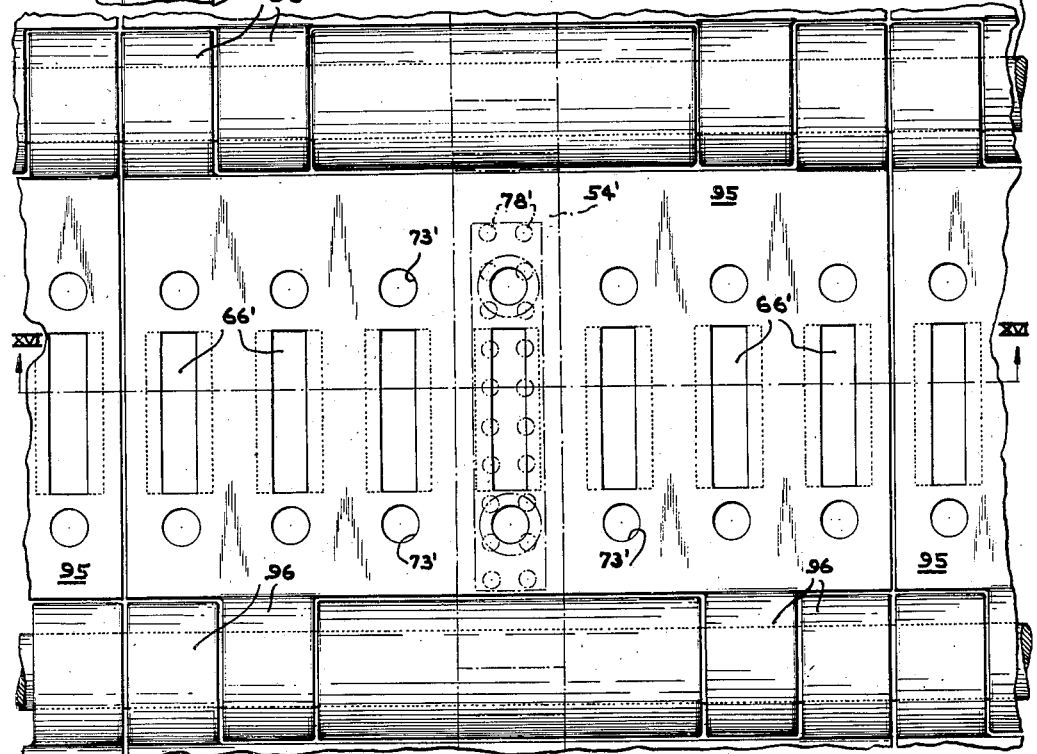
Fig. 17 is a fragmentary plan view of apparatus shown in Fig. 16 with the grate bars removed.
Figure 18:
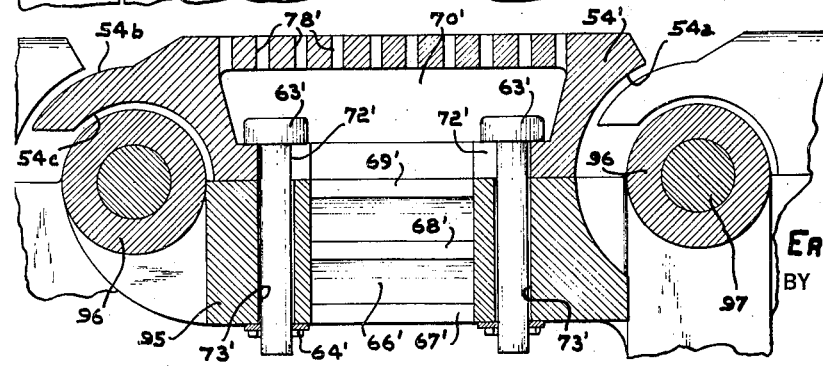
Fig. 18 is a sectional view taken along the line XVIII—XVIII of Fig. 16.

In Figs. 16, 17, and 18, instead of the supporting structure being constituted by spaced rows of links and pivot pins arranged to provide rectangular spaces for grate bars, the structure is comprised by plate-like elements 95 having cooperating hinge portions 96 connected by hinge rods or pins 97. Each plate is provided with a multiplicity of passages 66′ similar to the link passages 66 already described, extending therethrough and having ribs 67′, 68′ and 69′ forming a multiplicity of orifices extending transversely of each passage.

A multiplicity of grate bars 54′, similar to the relatively shallow bars 54 already described, are carried by each plate 95, the bars having hollow interior spaces or chambers 70′ and tuyère passages 78′ providing for the emission of air from the spaces to the fuel. As in Fig. 3, the bars 54′ have notched flanges 72′ underneath the heads of hold-down bolts 63′ whose shanks extend through openings 73′ formed in the link structure, cotter pins 64′ cooperating with the lower ends of the hold-down pins or bolts to hold the grate bars in place.

From the foregoing it will be apparent that I have devised a link grate for a stoker comprising a link structure which is given movement of an undulatory character and which is entirely covered by grate bars providing the fuel-supporting surface. In consequence of separation of the two main or principal parts in the light of functions performed thereby, it is possible to select materials having physical properties suitable to the conditions and requirements of operation of each part. Furthermore, it will be noted that all of the grate bars are supported from the links and detachably connected thereto, the detachable connections being accessible so that bars may be removed and replaced from within the combustion chamber without detaching any parts except the grate bar hold-down bolts or fastenings. In addition to these features, the bars are constructed and arranged to provide passages for furnishing air from the space below the grate to the fuel bed supported thereby and ribs cooperate with each passage to form a plurality of orifices arranged in series in the direction of flow therein, the passages orificed in this manner assuring of good air distribution throughout the grate area even though wide variations in fuel bed resistance thereover should occur.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a link grate for a stoker, a plurality of links, pins for connecting the links pivotally in end-to-end relation, means on the pins for spacing the pivoted links so as to define rectangular link spaces, means providing a grate surface including groups of bars fitting in said rectangular spaces and bars covering the links, means for supporting all of the bars from the links and including lateral flanges at the bottom of each link and upon which the outermost bars of the group in each rectangular space rest, means for holding the bars in place endwise with respect to the links, and hold-down means cooperating with the bars and the links.

2. In a link grate for a stoker, a plurality of spaced parallel rows of links, pins for pivotally connecting the links in end-to-end relation, means carried by the pins for spacing the links of each row apart so as to define rectangular link spaces, means providing a grate surface including groups of grate bars fitting in said spaces and bars covering the links, the latter bars being of less depth than the former, means for connecting the grate bars of each group together to form a unit, means for supporting all of the bars from the links, means for holding the bars in place lengthwise with respect to the links, and detachable hold-down means for the bars and cooperating with the links.

3. In a link grate for a stoker, a plurality of parallel rows of links, pins for pivotally connecting the links in end-to-end relation, means on the pins for spacing the links to define rectangular link spaces, means providing a grate surface including groups of bars fitting in said spaces and bars covering the links, said first bars having relatively greater depth than the second bars so that the tops of the bars may be in a common fuel-supporting surface, means for connecting the bars of each group together comprising interfitting recesses and projections carried by adjoining bars, means for supporting all of the bars from the links and including lateral flanges provided at the bottom of each link and upon which the outermost bars of each group rest, means for holding the bars in place longitudinally with respect to the links, and detachable hold-down means for the bars and cooperating with the links.

4. In a link grate for a stoker, a plurality of parallel rows of links, pins for pivotally connecting the links in end-to-end relation, spacing means cooperating with the pins and with the links so that the links and the pins define a plurality of rectangular spaces, means providing a grate surface including groups of bars fitting in said spaces and bars covering the links, means for connecting the group of bars for each space together as a unit and including interfitting recesses and projections carried by the bars and one or more through bolts, means for supporting each group of bars from adjacent links and including lugs projecting laterally therefrom and the bottoms thereof and upon which lugs the outermost of the bars of the group rest, and means for holding each group of bars in place in its rectangular space including upper projections carried by the outermost bars of the group, projections carried by the link-covering bars and overlapping the upper lateral projections, and hold-down bolts for connecting the link-covering bars to the links.

5. In a grate construction, a plurality of rows of links pivotally connected together in end-to-end relation, pivotal connections between adjacent ends of adjacent links of each row, the links of adjacent rows being spaced apart and corresponding pivotal connections of the rows being aligned transversely of the length of the links, groups of grate bars in the spaces between adjacent links of adjacent rows and between adjacent pivotal connections, means for connecting the bars of each group together as a unit, lateral lugs on the links for supporting the outermost bars of each group, other bars covering the links, and detachable means for holding the groups in place in the spaces and said other bars in place over the links.

6. In a grate construction, a plurality of rows of links, pivotal connections between adjacent ends of adjacent links of each row, the links of adjacent rows being spaced apart and corresponding pivotal connections of the rows being aligned transversely of the length of the links, groups of grate bars for the spaces between adjacent links of adjacent rows and between adjacent pivotal connections, means for connecting the bars of each group together as a unit, lateral lugs on the links for supporting the outermost bars of each group, other bars covering the links, and means for holding the groups in place in the spaces and said other bars in place over the links, each bar having terminal portions with the terminal portion at one end provided with a lower concave surface and the terminal portion at the other end provided with a convex upper surface so that, with the bars in assembled relation, the concave and convex surfaces will overlap and overlie the pivotal connections.

7. In a stoker, a plurality of supporting members extending longitudinally in the direction of fuel feed and pivotally connected together in end-to-end relation about axes extending transversely to the direction of fuel feed, grate bars extending longitudinally in the direction of fuel feed and superposed upon the supporting members and having internal chambers extending lengthwise and opening through the bottoms thereof and provided with tuyère openings communicating with the chambers, said supporting members having their upper surfaces fitting flush with the lower surfaces of the grate bars and having passages and ribs providing a plurality of orifices for each passage, said passages extending through the members and communicating with said chambers, and means cooperating with the grate bars internally thereof for securing them to the supporting members.

8. In a link grate for a stoker, a plurality of parallel rows of links, rods for pivotally connecting the links of each row in end-to-end relation, spacing means cooperating with the rods and with the links so that the latter and the rods define a plurality of rectangular spaces, grate bars including bars covering the links and groups of bars fitting in said rectangular spaces, means for supporting all of the bars from the links and including arrangements providing for the connection of all of the bars of each group such that the latter may be supported by the outside bars from the links, said bars having internal chambers extending lengthwise thereof and provided with tuyère openings communicating with the chambers and said grate bars and links having passages communicating with the chambers, means including ribs providing a plurality of orifices arranged in series in the direction of flow in each passage, and means for detachably fastening all of the bars to the links.

9. In a link grate for a stoker, a plurality of parallel rows of links, pins for pivotally connecting the links of each row in end-to-end relation, spacing means cooperating with the pins and with the links so that the links and the pins define a plurality of rectangular spaces, means providing a grate surface including groups of bars fitting in said spaces and bars covering the links, means for connecting the group of bars for each space together as a unit and including interfitting recesses and projections carried by the bars and one or more through bolts, lateral supports on the links of each rectangular space and co-operating with the outermost bars of each group for supporting the latter, and means for holding each group of bars in place in its rectangular space including interfitting projections carried by the outermost bars of each group and the adjacent link covering bars and hold-down bolts for connecting the link-covering bars to the links, said links each having a passage formed therein and provided with ribs forming a multiplicity of orifices extending transversely of the direction of flow in the passage and all of said grate bars being hollow and having tuyère passages affording communication between the hollow interiors thereof and the fuel-supporting surface, said link-covering bars having the hollow interiors thereof in communication with the passages formed in the links and said bars of each group having openings at the bottoms thereof communicating with the hollow interiors and provided with a multiplicity of ribs forming orifices extending transversely of the direction of flow in the passages provided by the hollow interiors.

10. In a grate construction, a plurality of rows of links extending longitudinally in the direction of fuel feed; pivotal connections for adjacent ends of adjacent links and extending transversely of the direction of fuel feed; and corresponding connections of the rows being aligned transversely of the length of the links; a plurality of grate bars extending longitudinally in the direction of fuel feed and disposed in side-by-side relation parallel to the links and in end-to-end relation with adjacent ends of adjacent bars having overlapping portions disposed above the pivotal connections; each of said bars having an elongated hollow interior opening through the bottom side thereof and provided with tuyère openings affording communication of the interior with the fuel-supporting surface; each of said links having an elongated hollow space opening through the bottom and top surfaces thereof; at least some of said bars being in superposed relation with respect to said links and having their bottom openings communicating with the top elongated openings of the links; and means engaging the superposed bars interiorly of the structures thereof for detachably connecting them to the links.

EARLL R. STONE.